(12) United States Patent
Jha et al.

(10) Patent No.: US 8,222,780 B2
(45) Date of Patent: Jul. 17, 2012

(54) GENERATOR ROTOR MAIN LEAD SUPPORT AND LEAD PATH CONFIGURATION

(75) Inventors: Sanjeev Kumar Jha, Bangalore (IN); Richa Awasthi, Bangalore (IN); James Jonathan Grant, Niskayuna, NY (US); Madhu Bharadwaj Sridharan, Bangalore (IN)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 12/911,028

(22) Filed: Oct. 25, 2010

(65) Prior Publication Data

US 2012/0098385 A1     Apr. 26, 2012

(51) Int. Cl.
*H02K 11/00*     (2006.01)
*H02K 3/46*     (2006.01)

(52) U.S. Cl. .................................. 310/71; 310/270
(58) Field of Classification Search .............. 310/71, 310/260, 261.1, 262, 270, 271
See application file for complete search history.

(56) References Cited

U.S. PATENT DOCUMENTS

| | | | |
|---|---|---|---|
| 3,980,910 A * | 9/1976 | Steinebronn et al. ........... | 310/71 |
| 4,712,029 A | 12/1987 | Nold | |
| 4,870,308 A | 9/1989 | Sismour, Jr. | |
| 5,063,320 A | 11/1991 | Watanabe et al. | |
| 5,122,696 A | 6/1992 | Shih et al. | |
| 5,241,231 A | 8/1993 | Haditsch et al. | |
| 5,358,432 A | 10/1994 | Shih et al. | |
| 6,424,063 B1 * | 7/2002 | Whitener et al. .............. | 310/71 |
| 6,453,540 B1 | 9/2002 | Blakelock et al. | |
| 6,501,201 B1 | 12/2002 | Whitener et al. | |
| 6,628,023 B1 * | 9/2003 | Paquet ........................... | 310/71 |
| 6,632,109 B2 | 10/2003 | Irwin et al. | |
| 6,930,434 B1 | 8/2005 | Spencer et al. | |
| 7,129,605 B2 | 10/2006 | Zhang et al. | |
| 7,247,966 B2 | 7/2007 | Shore et al. | |
| 7,256,528 B2 * | 8/2007 | Jurado et al. .................. | 310/270 |
| 7,830,052 B2 * | 11/2010 | Gardner et al. ................ | 310/71 |
| 8,004,145 B2 * | 8/2011 | Yanagisawa et al. .......... | 310/270 |
| 2007/0080591 A1 | 4/2007 | Semba et al. | |

FOREIGN PATENT DOCUMENTS

WO     2009/137001 A1     11/2009

OTHER PUBLICATIONS

Search Report issued in connection with GB Patent Application No. 1118122.9, Feb. 23, 2012.

* cited by examiner

*Primary Examiner* — Quyen Leung
*Assistant Examiner* — Thomas Truong
(74) *Attorney, Agent, or Firm* — Hoffman Warnick LLC; Ernest Cusick (57) ABSTRACT

Embodiments of the invention relate generally to lead path configurations in generator rotors and, more particularly, to a support apparatus for a main lead and generator rotors incorporating such a support apparatus. In one embodiment, the invention provides a support apparatus for a main lead of a generator rotor, the support apparatus comprising: a cross-sectionally L-shaped body having: a first portion; and a second portion substantially perpendicular to the first portion, wherein the first portion includes an arcuate first surface for interfacing with a centering ring of the generator rotor and an arcuate second surface adapted to be substantially parallel to a rotor shaft of the generator rotor; a main lead passage extending along the arcuate first surface of the first portion and through the second portion.

17 Claims, 8 Drawing Sheets

GENERATOR ROTOR MAIN LEAD SUPPORT AND LEAD PATH CONFIGURATION

BACKGROUND OF THE INVENTION

Embodiments of the invention relate generally to lead path configurations in generator rotors and, more particularly, to a support apparatus for a main lead and generator rotors incorporating such a support apparatus.

Generator rotors include an axial rotor surrounded, at least in part, by an annular stator. As the rotor rotates, an electrical current is generated in conductive coil windings within the stator. An electrically conductive lead path forms a loop from an exciter, into the coil windings, and back. Over extended periods of operation, however, physical stresses can lead to partial or complete severing of the lead path. As a consequence, the conductive quality of the lead path may be diminished, current may be lost to nearby conductive materials, and/or electrical arcing may result. Arcing and loss of current to other conductive materials may melt or otherwise damage the generator rotor or other generator components.

BRIEF DESCRIPTION OF THE INVENTION

In one embodiment, the invention provides a support apparatus for a main lead of a generator rotor, the support apparatus comprising: a cross-sectionally L-shaped body having: a first portion; and a second portion substantially perpendicular to the first portion, wherein the first portion includes an arcuate first surface for interfacing with a centering ring of the generator rotor and an arcuate second surface adapted to be substantially parallel to a rotor shaft of the generator rotor; a main lead passage extending along the arcuate first surface of the first portion and through the second portion.

In another embodiment, the invention provides a generator rotor comprising: a rotor shaft including an internal conductive bore; a main terminal electrically connected to the conductive bore; a plurality of rotor coil windings, including a plurality of coil end straps; a centering ring adjacent the plurality of coil windings; a support apparatus for supporting a main lead and attached to the centering ring, the support apparatus comprising: a cross-sectionally L-shaped body having: a first portion; and a second portion substantially perpendicular to the first portion, wherein the first portion includes an arcuate first surface for interfacing with a centering ring of the generator rotor and an arcuate second surface adapted to be substantially parallel to a rotor shaft of the generator rotor; a main lead passage extending along the arcuate first surface of the first portion and through the second portion; and a main lead extending from the main terminal, through the main lead passage of the support apparatus, along the plurality of rotor coil windings, to at least one of the plurality of coil end straps.

In yet another embodiment, the invention provides a generator rotor comprising: a rotor shaft including an internal conductive bore; a main terminal electrically connected to the conductive bore; a plurality of rotor coil windings, including a plurality of coil end straps; a non-metallic support channel comprising an elongate, axially-oriented channel; and at least one protrusion extending from the elongate, axially-oriented channel to a position between two of the plurality of coil end straps; and a main lead extending from the main terminal, through the elongate, axially-oriented channel of the non-metallic support channel, to at least one of the plurality of coil end straps.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 1:
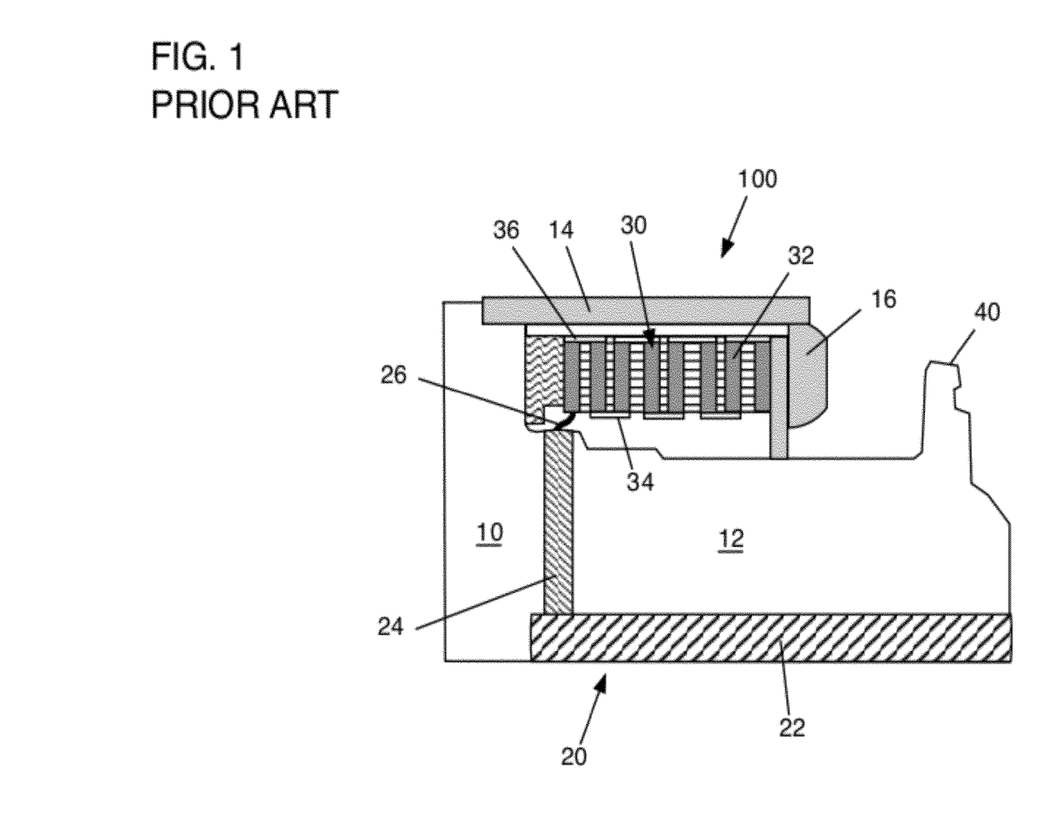
FIG. 1 shows a cross-sectional side view of a typical air-cooled generator rotor lead path.

Turning now to the drawings, FIG. 1 shows a cross-sectional side view of a lead path 20 in a known air-cooled generator 100 comprising a rotor body 10 and rotor shaft 12. Bore copper 22 (i.e., a conductive material along an internal bore of rotor shaft 12) extends axially through rotor shaft 12 and a main terminal 24 extends radially to rotor coil windings 30. Where main terminal 24 electrically connects with rotor coil windings 30, a gooseneck member 26 is commonly employed. Other components of generator 100 include a retaining ring 14, a centering ring 16, and a fan mount 40. Rotor coil windings 30 include a plurality of coil end straps 32. Coil-to-coil connectors 34, 36 connect adjacent coils alternately at the bottoms and tops, respectively, of coil end straps 32 to complete the circuit. Generators with lead path configurations such as that shown in FIG. 1 often experience lead path failures in the area of gooseneck member 26.

It is noted that FIG. 1 and similar figures described below show only a portion of a generator most relevant to description of the various embodiments of the invention. Rotor body 10 and rotor shaft 12, for example, extend below bore copper 22 and both into and out of the page, as will be apparent to one skilled in the art.

Figure 2:
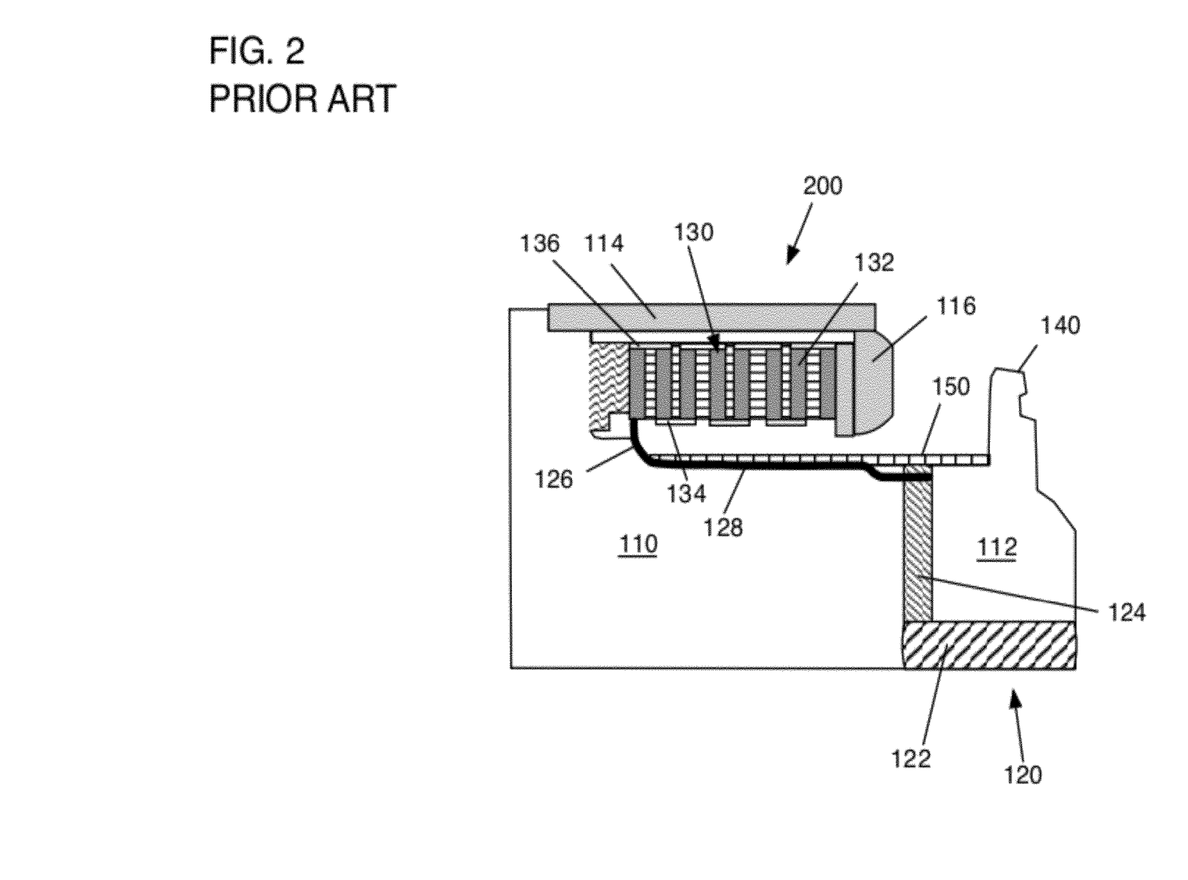
FIG. 2 shows a cross-sectional side view of a typical liquid-cooled generator rotor lead path.

FIG. 2 shows a cross-sectional side view of a lead path 120 in a known liquid-cooled generator 200. Main terminal 124 extends radially from bore copper 122. Main lead 128 extends from main terminal 124. Lead path configurations such as that shown in FIG. 2 typically require one or more lead wedges 150 to retain main lead 128 in position along rotor body 110. In some configurations, a slot is cut into rotor body 110, into which main lead 128 lies. A J-strap 126 makes the connection to rotor coil windings 130 and is often a point at which lead path failures are experienced.

As will be explained in greater detail below, advantages that may be realized in the practice of some embodiments of the described invention include avoidance of the need for a separate slotting operation to form a slot into which the main lead lies and elimination of the need for lead wedges. Avoiding these additional steps and components may reduce costs and simplify the manufacture, assembly, and maintenance of generators in which the various embodiments of the invention are incorporated.

Figure 3:
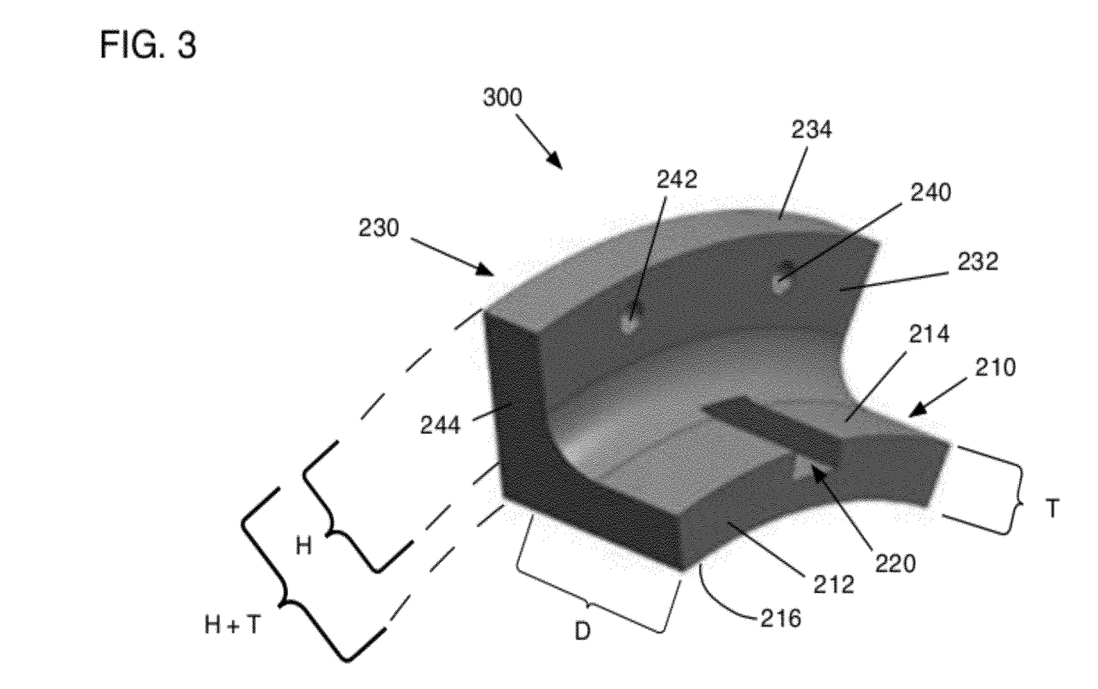
FIGS. 3 and 4 show perspective and side views, respectively, of a main lead support apparatus according to an embodiment of the invention.

FIG. 3 shows a perspective view of a support apparatus 300 for supporting a main lead along a portion of a lead path, according to one embodiment of the invention. Support apparatus 300 includes a first body portion 210 and a second body portion 230 arranged substantially perpendicular thereto, to form an "L" shape in cross-section. First body portion 210 includes a first face 212, a first arcuate top surface 214 substantially perpendicular to first face 212, and an arcuate bottom surface 216 substantially perpendicular to first face 212 and substantially parallel to first arcuate top surface 214. First body portion 210 has a thickness T.

As used herein, the terms "top" and "bottom" are intended to refer merely to relative positions within the figures shown. Inversion of support apparatus 300, for example, would result in first arcuate top surface 214 lying beneath arcuate bottom surface 216.

Second body portion 230 includes a second face 232 substantially parallel to first face 212 and separated therefrom by a depth D of first arcuate top surface 214. A second arcuate top surface 234 lies substantially parallel to first arcuate top surface 214 and is separated therefrom by a height H of second body portion 230. A height of support apparatus 300 includes height H and thickness T. Support apparatus 300 includes an edge 244 at which each of first face 212, first arcuate top surface 214, arcuate bottom surface 216, second face 232, and second arcuate top surface 234 terminates. (A second, similar edge 246 is shown in FIG. 4, described below.)

A main lead passage 220 extends from first face 212 through first body portion 210 to an opening (shown in FIG. 4 below) in second body portion 230 and extends from first arcuate top surface 214 into first body portion 210 to a depth less than thickness T. That is, main lead passage 220 forms a void through which a main lead may pass through, and be supported by, support apparatus 300.

In FIG. 3, support apparatus 300 is shown further including fastener holes 240, 242 which, as will be described in greater detail below, may be employed to attach support apparatus 300 to a centering ring of a generator rotor. Fasteners may include, for example, bolts, rivets, and screws. Other fastening devices and mechanisms may similarly be used and are within the scope of the invention, as will be apparent to one skilled in the art. Similarly, while support apparatus 300 is shown in FIG. 3 including two fastener holes 240, 242, more or fewer fastener holes or similar fastening/coupling devices and mechanisms may be employed in other embodiments of the invention.

Figure 4:
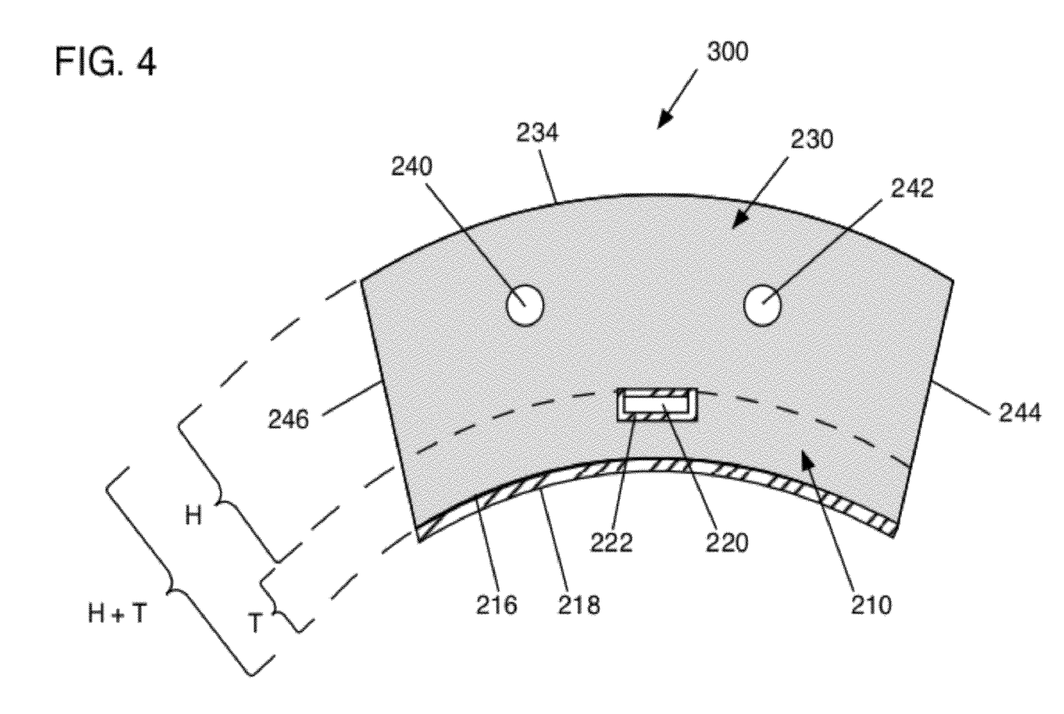

FIG. 4 shows a side view of support apparatus 300, as viewed facing second body portion 230 with first body portion 210 hidden and shown in phantom. In some embodiments, both first body portion 210 and second body portion 230 are non-metallic. Non-metallic materials suitable for inclusion in first body portion 210, second body portion 230, or both, include, for example, nylons, polyethylenes, rubbers, ceramics, and glasses. Other suitable materials will be apparent to one skilled in the art and are within the scope of the invention.

In other embodiments, first body portion 210, second body portion 230, or both, may include metallic materials. Suitable metallic materials include, for example, steel, brass, copper, aluminum, titanium, and alloys thereof. Other metallic materials are also included within the scope of the invention, as will be recognized by one skilled in the art. In embodiments where metallic materials are included in first body portion 210 and/or second body portion 230, an insulating layer 222 may be included within main lead passage 220.

In FIG. 4, a similar insulating layer 218 may be included along arcuate bottom surface 216. Suitable insulating materials for use in insulating layers 218, 222 include, for example, ceramics and glasses, such as epoxy glass. Other insulating materials may be employed, as will be recognized by one skilled in the art, and are within the scope of the invention.

Figure 5:
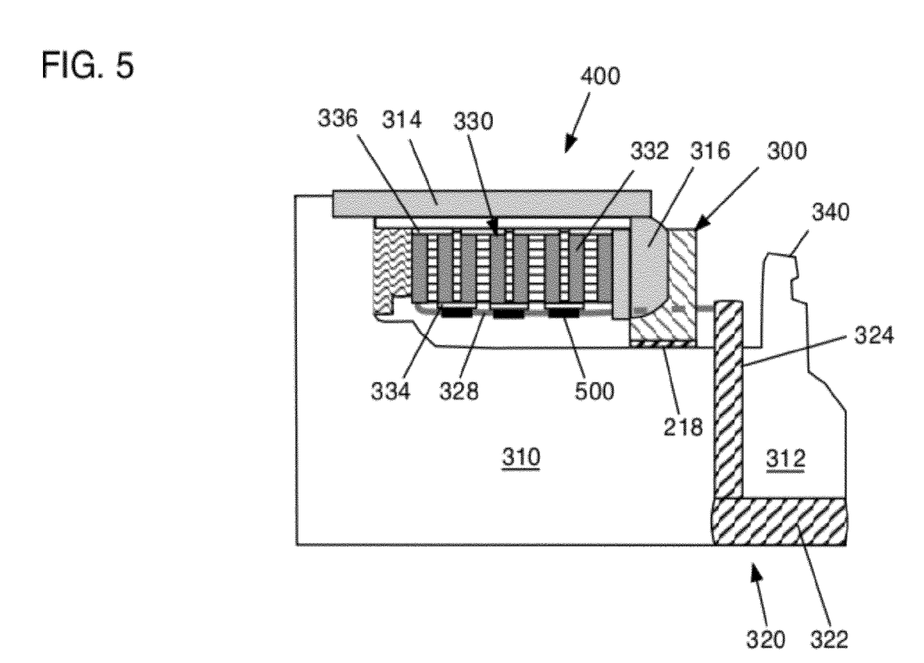
FIG. 5 shows a cross-sectional side view of a generator rotor lead path including the main lead support of FIGS. 3 and 4, according to an embodiment of the invention.

FIG. 5 shows a cross-sectional side view of a generator rotor 400 according to an embodiment of the invention. Support apparatus 300 is shown attached to centering ring 316. Main lead 328 passes from a main terminal 324, through support apparatus 300 (i.e., through main lead passage 220 (FIGS. 3-4)) and along rotor coil windings 330. Main lead 328 may be supported along rotor coil windings 330 by a plurality of attaching devices 500 attached to coil-to-coil connectors 334.

Several advantages may be realized in practicing the embodiment of the invention shown in FIG. 5. Both the slotting and lead wedges typical of lead path configurations such as that shown in FIG. 2 are eliminated. The gooseneck member (26 in FIG. 1) typical of other configurations is similarly eliminated. Servicing of main terminal 324 and other components of the lead path 320 is easier and requires less or no disassembly of generator rotor components. The positioning of main terminal 324 closer to fan mount 340 provides greater cooling of main terminal 324 than in other lead path configurations.

Significantly, the lead path configuration shown in FIG. 5 and similar configurations according to other embodiments of the invention are suitable for use in both air-cooled generator rotors and liquid-cooled generator rotors. That is, a single lead path configuration may be scaled according to the duty requirements of the generator rotor. As shown in FIGS. 1 and 2, significantly different lead path configurations are currently used in air-cooled and liquid-cooled generator rotors.

Figure 6:
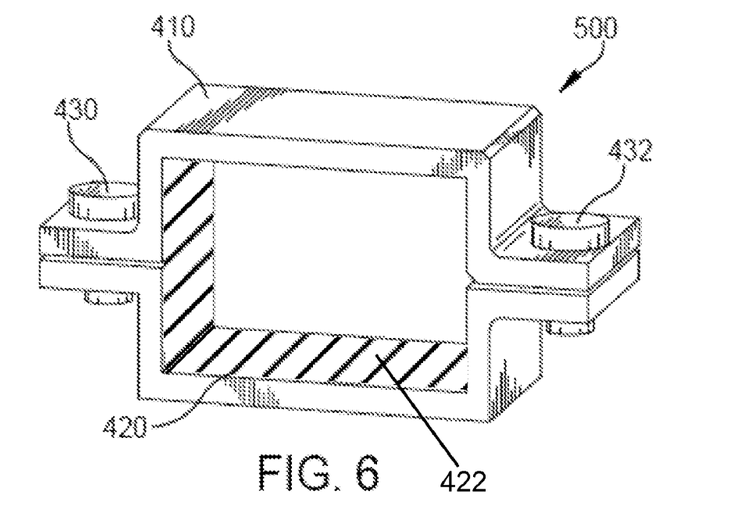
FIGS. 6 and 7 show perspective views of attaching devices for attaching a main lead along a portion of a lead path according to an embodiment of the invention.

FIG. 6 shows a perspective view of attaching device 500 of FIG. 5. In the embodiment of FIG. 6, attaching device 500 includes a first body member 410 and a second body member 420, which may be secured together by a pair of fasteners 430, 432. In use, first body member 410 would typically be placed over a coil-to-coil connector (334 in FIG. 5) and the main lead (328 in FIG. 5) positioned beneath the coil-to-coil connector, and both secured from below by second body member 420. In some embodiments, the coil-to-coil connector and main lead are separated by an insulating material 422, such as may be used in insulating layers 218, 222 (FIG. 4), as described above.

Figure 7:
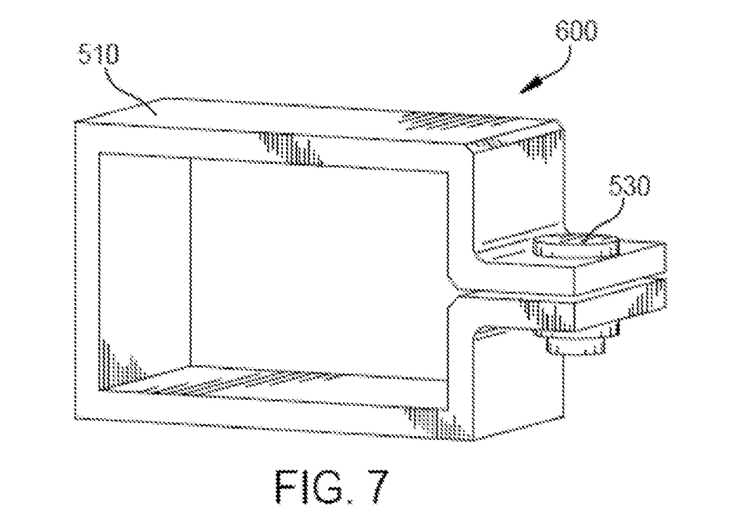

FIG. 7 shows another embodiment of an attaching device 600 in which the body 510 is unitary and secured by a single fastener 530. Use of attaching device 600 is similar to that described above with respect to the embodiment of FIG. 6.

Figure 8:
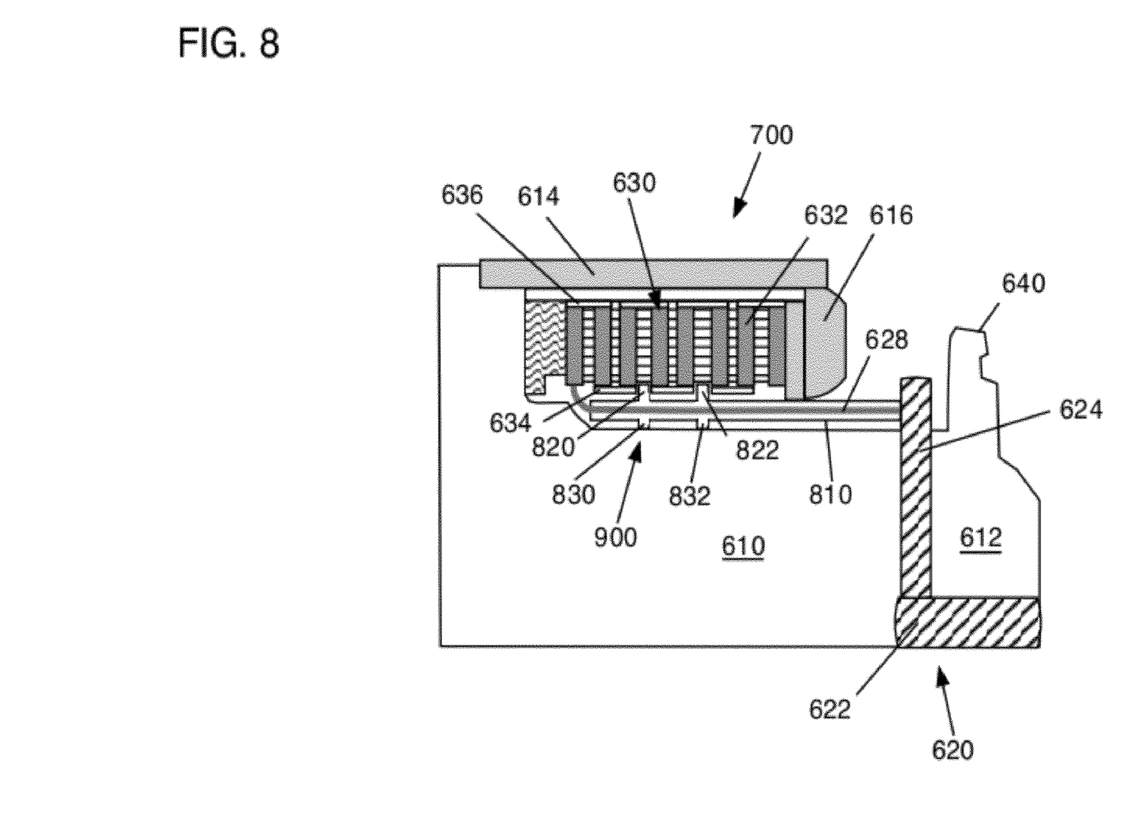
FIG. 8 shows a cross-sectional side view of a generator rotor lead path according to an embodiment of the invention.

FIG. 8 shows a cross-sectional side view of a generator rotor 700 having a lead path 620 according to another embodiment of the invention. In FIG. 8, main lead 628 is enclosed within a non-metallic support channel 900 beneath rotor coil windings 630. Support channel 900 includes an elongate, axially-oriented channel 810 and a plurality of protrusions 820, 822, 830, 832. Some protrusions 820, 822 extend upward (i.e., away from rotor body 610) from channel 810 to reside between adjacent coil-to-coil connectors 634 and/or adjacent coil end straps 632, thereby restricting movement of support channel 900 and main lead 628 in non-axial directions. In order to permit axial movement of main lead 628 and/or rotor coil windings 630, a width of protrusions 820, 822 is preferably less than a space between coil end straps 632 adjacent alternate coil-to-coil connectors 634. In some embodiments, to prevent or reduce movement of main lead 628 in non-axial directions, one or more attaching devices, such as those shown in FIGS. 6 and 7, may be used to secure channel 810 to coil-to-coil connectors 634.

Other protrusions 830, 832 extend downward (i.e., toward rotor body 610) from channel 610 to reside along or adjacent rotor body 610, thereby restricting movement of support channel 900 and main lead 628 toward rotor body 610.

Support channel 900, including channel 810 and protrusions 820, 822, 830, 832 are non-metallic and may include any number of non-metallic materials. Suitable materials include, for example, glasses and ceramics. In some embodiments, support channel 900 is comprised primarily or exclusively of an epoxy glass.

Figure 9:
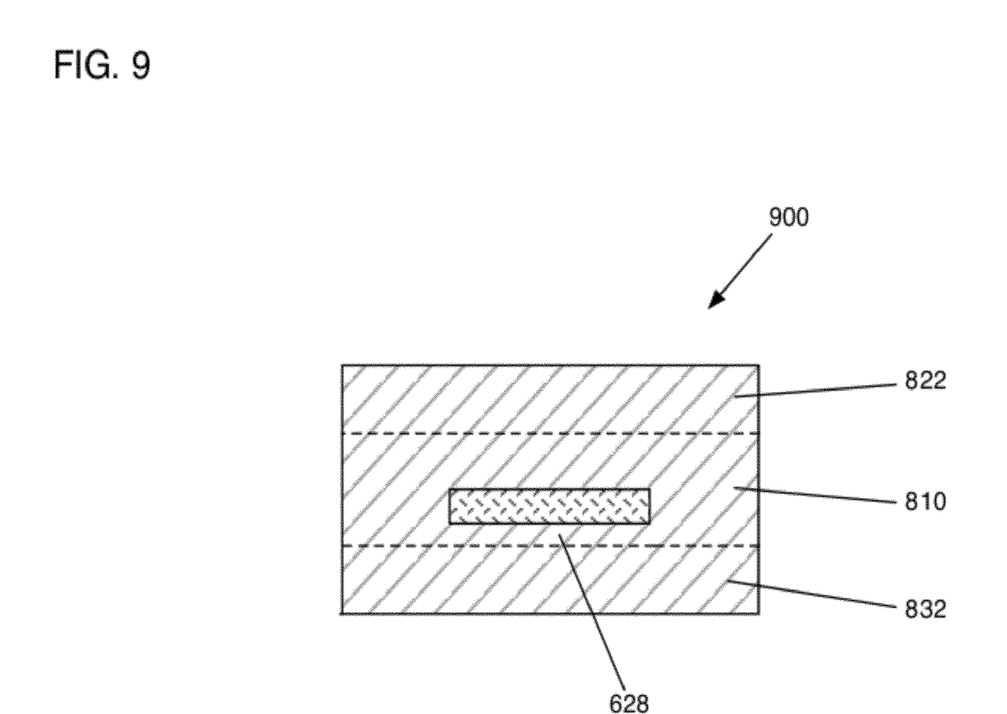
FIG. 9 shows a cross-sectional view of a non-metallic support channel according to an embodiment of the invention.

FIG. 9 shows a cross-sectional view of support channel 900. Protrusion 822 extends upward (i.e., away from rotor body 610 (FIG. 8)) and protrusion 832 extends downward (i.e., toward rotor body 610) from channel 810. Main lead 628 resides within channel 810 and above protrusion 832.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A support apparatus for a main lead of a generator rotor, the support apparatus comprising:
    a cross-sectionally L-shaped body having:
        a first portion; and
        a second portion substantially perpendicular to the first portion,
        wherein the first portion includes an arcuate first surface for interfacing with a centering ring of the generator rotor and an arcuate second surface adapted to be substantially parallel to a rotor shaft of the generator rotor;
    a main lead passage extending along the arcuate first surface of the first portion and through the second portion.

2. The support apparatus of claim 1, further comprising:
    at least one edge at which each of the arcuate first surface of the first portion, the arcuate second surface of the first portion, and the second portion terminates.

3. The support apparatus of claim 1, further comprising:
    at least one fastener hole extending through the second portion.

4. The support apparatus of claim 1, wherein both the first portion and the second portion are non-metallic.

5. The support apparatus of claim 4, wherein the first portion and the second portion include at least one material selected from a group consisting of: a nylon, a polyethylene, a rubber, a ceramic, and a glass.

6. The support apparatus of claim 1, wherein at least the first portion includes at least one metallic material.

7. The support apparatus of claim 6, wherein the at least one metallic material is selected from a group consisting of: steel, brass, copper, aluminum, titanium, and alloys thereof.

8. The support apparatus of claim 6, further comprising:
    a first insulating layer within the main lead passage; and
    a second insulating layer along the arcuate second surface.

9. A generator rotor comprising:
    a rotor shaft including an internal conductive bore;
    a main terminal electrically connected to the conductive bore;
    a plurality of rotor coil windings, including a plurality of coil end straps;
    a centering ring adjacent the plurality of coil windings;
    a support apparatus for supporting a main lead and attached to the centering ring, the support apparatus comprising:
    a cross-sectionally L-shaped body having:
        a first portion; and
        a second portion substantially perpendicular to the first portion,
        wherein the first portion includes an arcuate first surface for interfacing with the centering ring and an arcuate second surface adapted to be substantially parallel to the rotor shaft;
        a main lead passage extending along the arcuate first surface of the first portion and through the second portion; and
    wherein the main lead extends from the main terminal, through the main lead passage of the support apparatus, along the plurality of rotor coil windings, to at least one of the plurality of coil end straps.

10. The generator rotor of claim 9, further comprising:
    at least one coil-to-coil connector attached to at least two of the plurality of coil end straps.

11. The generator rotor of claim 10, further comprising:
    at least one attaching device for attaching the main lead and attached to the at least one coil-to-coil connector,
    wherein the main lead passes through the at least one attaching device.

12. The generator rotor of claim 11, further comprising:
    an insulating layer between the at least one attaching device and the main lead.

13. The generator rotor of claim 9, wherein both the first portion and the second portion of the support apparatus are non-metallic.

14. The generator rotor of claim 13, wherein each of the first portion and the second portion independently includes at least one material selected from a group consisting of: a nylon, a polyethylene, a rubber, a ceramic, and a glass.

15. The generator rotor of claim 9, wherein at least the first portion of the support apparatus includes at least one metallic material selected from a group consisting of: steel, brass, copper, aluminum, titanium, and alloys thereof; and
    the support apparatus further comprises:
        a first insulating layer within the main lead passage; and
        a second insulating layer along the arcuate second surface.

16. The generator rotor of claim 9, wherein the cross-sectionally L-shaped body further comprises:
    at least one edge at which each of the arcuate first surface of the first portion, the arcuate second surface of the first portion, and the second portion terminates.

17. The generator rotor of claim 9, wherein the cross-sectionally L-shaped body further comprises:
   at least one fastener hole extending through the second portion.

* * * * *